United States Patent
Inagaki et al.

[11] Patent Number: 5,970,198
[45] Date of Patent: Oct. 19, 1999

[54] OPTICALLY AMPLIFYING FIBER AND OPTICAL FIBER AMPLIFIER

[75] Inventors: Shinya Inagaki, Kawasaki; Norifumi Shukunami, Sapporo; Keiko Takeda; Koji Okamura, both of Kawasaki, all of Japan

[73] Assignee: Fujitsu Limited, Kawasaki, Japan

[21] Appl. No.: 09/041,769

[22] Filed: Mar. 13, 1998

[30] Foreign Application Priority Data

Oct. 17, 1997 [JP] Japan .................................. 9-285098

[51] Int. Cl.⁶ .............................. G02B 6/02; G02B 27/30
[52] U.S. Cl. .................... 385/127; 385/128; 359/341; 372/6
[58] Field of Search ..................... 385/123, 124, 385/126, 127; 359/341, 115; 372/6

[56] References Cited

U.S. PATENT DOCUMENTS

| | | | |
|---|---|---|---|
| 5,058,976 | 10/1991 | DiGiovanni et al. | 359/341 |
| 5,364,429 | 11/1994 | Le Sergent | 65/399 |
| 5,365,388 | 11/1994 | Takeda et al. | |
| 5,640,269 | 6/1997 | Shigematsu et al. | 359/341 |

FOREIGN PATENT DOCUMENTS

| | | |
|---|---|---|
| 0 762 569 A2 | 8/1996 | European Pat. Off. . |
| 3-212623 | 9/1991 | Japan . |
| 4-359230 | 12/1992 | Japan . |
| 2 306 763 | 5/1997 | United Kingdom . |
| WO 93/02492 | 2/1993 | WIPO . |

OTHER PUBLICATIONS

S. Inagaki, et al., "Novel Ring–Doped Erbium Doped Fiber with Wide Dynamic Range for Optical Amplifier in 2–Wavelength WDM Systems", 4 pgs., no publication date available.

M. Kakui, et al, "Development of Hybrid EDFAs for WDM Optical Transmission"; *The Institute of Electronics,* pp. 45–50, Jun. 1996.

*Primary Examiner*—Hemang Sanghavi
*Attorney, Agent, or Firm*—Staas & Halsey

[57] ABSTRACT

An optical amplifying fiber including a center core region doped with erbium, aluminum, and phosphor, and a ring region doped with erbium and aluminum, the ring region being radially spaced a given distance from the center core region.

9 Claims, 11 Drawing Sheets

OPTICALLY AMPLIFYING FIBER AND OPTICAL FIBER AMPLIFIER

FIELD OF THE INVENTION

The present invention relates to an optical fiber and an optical fiber amplifier using the optical fiber suitable for simultaneous amplification of wavelength division multiplexed (WDM) signal light.

DESCRIPTION OF THE RELATED ART

In recent years, a manufacturing technique and using technique for a low-loss (e.g., 0.2 dB/km) optical fiber have been established, and an optical communication system using the optical fiber as a transmission line has been put to practical use. Further, to compensate for losses in the optical fiber and thereby allow long-haul transmission, an optical amplifier for amplifying an optical signal has been put to practical use. As a technique for increasing a transmission capacity by a single optical fiber, wavelength division multiplexing (WDM) is known. In a system adopting WDM, a plurality of optical signals having different wavelengths are wavelength division multiplexed by an optical multiplexer to obtain WDM signal light, which is output to an optical fiber transmission line. On the receiving side, the WDM signal light received is separated into individual optical signals by an optical demultiplexer, and transmitted data is reproduced according to each optical signal.

Known as one of conventional optical amplifiers is an optical fiber amplifier including an optical fiber (doped fiber) doped with a rare earth element, and a pumping source for pumping the doped fiber so that the doped fiber has a gain band including the wavelength of an optical signal. For example, an EDFA (erbium doped fiber amplifier) including an erbium doped fiber (EDF) and a laser diode for outputting pump light having a wavelength band of 0.98 $\mu$m or 1.48 $\mu$m has been developed as an optical fiber amplifier for amplifying an optical signal having a wavelength of 1.55 m.

In the case of incorporating an EDFA into a system adopting WDM, it is preferable that output control in each channel can be performed. In a general EDF, the core is uniformly doped with erbium as a dopant. Accordingly, the gain characteristic (wavelength dependence of gain) of the EDF is univocally determined, so that individual output control of optical signals in all the channels cannot be performed. In this respect, the present inventors have disclosed a specific EDF structure and its using technique for individual output control of optical signals in plural channels in OPTICAL AMPLIFIERS AND THEIR APPLICATIONS (OAA), TECHNICAL DIGEST (July 1996). This technique will be hereinafter referred to as a ring doping technique.

Figure 1:
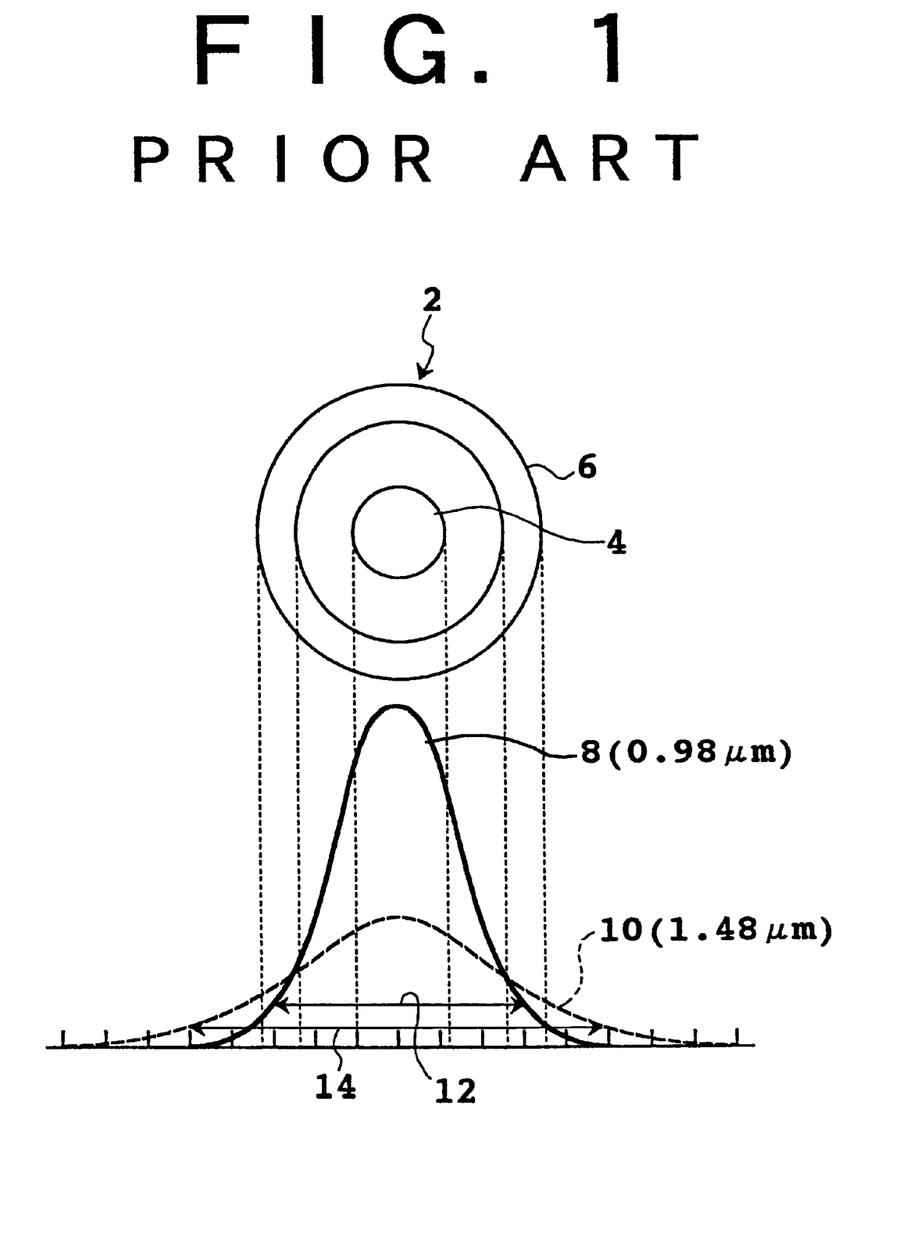
FIG. 1 is a view showing a sectional structure of a conventional Er doped fiber in relation to a mode field distribution of pump light.

The ring doping technique will now be described with reference to FIGS. 1 and 2. Referring to FIG. 1, reference numeral 2 denotes a portion of an EDF in the vicinity of its core as viewed in cross section. The EDF 2 has a center core region 4 of silicon (Si) doped with germanium (Ge) and erbium (Er), and a ring region 6 of Si doped with Al and Er. The ring region 6 is formed around the center core region 4 so as to be radially spaced a given distance from the center core region 4.

In FIG. 1, reference numerals 8 and 10 denote radial distributions of power density in the case of guiding pump light having a wavelength band of 0.98 $\mu$m and pump light having a wavelength band of 1.48 $\mu$m in the EDF 2, respectively. The mode field diameter of the pump light having the wavelength band of 0.98 $\mu$m is relatively small as shown by reference numeral 12, and the mode field diameter of the pump light having the wavelength band of 1.48 $\mu$m is relatively large as shown by reference numeral 14. Accordingly, the erbium contained in the center core region 4 can be selectively pumped by the pump light having the wavelength band of 0.98 $\mu$m, and the erbium contained in the ring region 6 can be selectively pumped by the pump light having the wavelength band of 1.48 $\mu$m.

Figure 2:
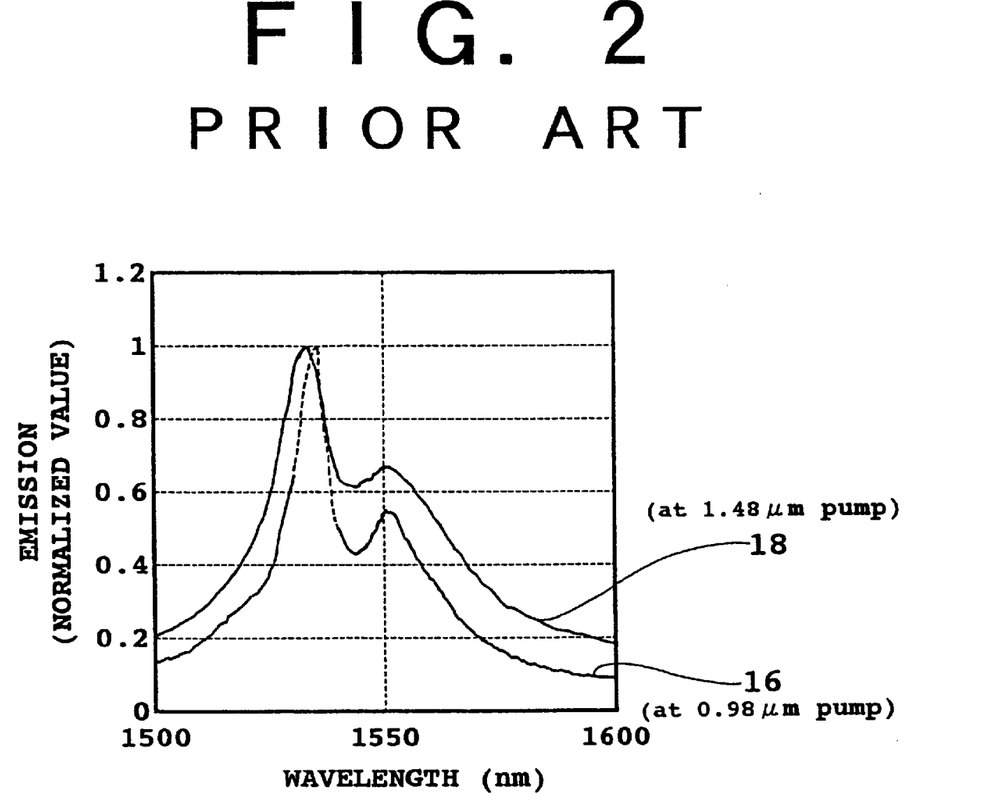
FIG. 2 is a graph showing two gain characteristics obtained by the conventional Er doped fiber.

Referring to FIG. 2, there are shown two gain characteristics obtained by the EDF 2 shown in FIG. 1. In FIG. 2, the vertical axis represents normalized value of emission, and the horizontal axis represents wavelength (nm). It is known that a wavelength characteristic of emission corresponds to a wavelength characteristic of gain (dB/m) per unit length of an EDF, i.e., a gain characteristic.

Based on the fact that the center core region 4 and the ring region 6 have different glass compositions, a relatively steep gain characteristic 16 is obtained when the EDF 2 is pumped by the pump light having the wavelength band of 0.98 $\mu$m, whereas a relatively gentle gain characteristic 18 is obtained when the EDF 2 is pumped by the pump light having the wavelength band of 1.48 m. Accordingly, by using such an EDF and at least two pumping sources to configure an optical fiber amplifier and applying the optical fiber amplifier to a WDM system, the output powers of optical signals in WDM channels can be individually controlled.

Further, a hybrid EDF obtained by suitably combining an Al doped EDF and a P/Al codoped EDF to flatten gain has been reported in IEICE, Technical Report CS96-39, OCS96-16 (1996-06). The technique described in this literature will be hereinafter referred to as a phosphor (P) doping technique. That is, the phosphor doping technique provides a characteristic such that the wavelength dependence of gain of an EDF is continuously reduced in a wavelength range of 1.545 $\mu$m to 1.560 $\mu$m by doping the EDF with phosphor (P). According to this phosphor doping technique, a flat gain-wavelength characteristic can be obtained in the wavelength range of 1.545 $\mu$m to 1.560 $\mu$m.

According to the ring doping technique as mentioned above, individual output power control of optical signals in WDM channels can be performed, and an input/output dynamic range of 5 dB can be ensured. However, this ring doping technique has a problem such that a gain peak appears at a wavelength of 1.552 $\mu$m and therefore a flat gain cannot be obtained in the wavelength range of 1.545 $\mu$m to 1.560 $\mu$m.

On the other hand, the phosphor doping technique mentioned above has an advantage such that a flat gain-wavelength characteristic can be obtained in the wavelength range of 1.545 $\mu$m to 1.560 $\mu$m under certain input/output conditions, but has a problem such that when the power of signal light to be input into the EDF is changed, a flat gain cannot be obtained in the above wavelength range.

SUMMARY OF THE INVENTION

It is therefore an object of the present invention to provide an optical amplifying fiber which can flatten the gain over a wide wavelength range.

It is another object of the present invention to provide an optical fiber amplifier suitably applicable to a WDM optical transmission system.

In accordance with an aspect of the present invention, there is provided an optical amplifying fiber comprising a center core region doped with erbium, aluminum, and phosphor; and a ring region doped with erbium and aluminum, said ring region being radially spaced a given distance from said center core region.

Preferably, when said optical amplifying fiber is pumped by two pump lights having wavelength bands of 0.98 μm and 1.48 μm, an optical loss in said ring region at a wavelength of 1.55 μm is 1.6 dB×0.8×15 or more. More preferably, when said optical amplifying fiber is pumped by two pump lights having wavelength bands of 0.98 μm and 1.48 μm, an optical loss in said center core region at a wavelength of 1.55 μm is 2.0 dB×2.2×15 or less.

In accordance with another aspect of the present invention, there is provided an optical fiber amplifier suitable for amplification of wavelength division multiplexed signal light, comprising an optical fiber having a center core region doped with Er, Al, P, and a ring region doped with Er and Al, said ring region being radially spaced a given distance from said center core region; a first pumping source for outputting first pump light having a first wavelength band; a second pumping source for outputting second pump light having a second wavelength band; a first multiplexer for coupling said first pump light to said optical fiber; a second multiplexer for coupling said second pump light to said optical fiber; a first coupler for branching amplified signal light output from said optical fiber to obtain monitor light; a second coupler for branching said monitor light into first and second monitor lights; a first filter for filtering said first monitor light to obtain first signal light having a wavelength $\lambda_1$; a second filter for filtering said second monitor light to obtain second signal light having a wavelength $\lambda_2$; a first photodetector for detecting said first signal light; a second photodetector for detecting said second signal light; and control means for controlling power levels and a power ratio of said first and second pump lights to be output from said first and second pumping sources so that outputs from said first and second photodetectors become equal to each other to reach a given level.

With this configuration, it is possible to provide an optical fiber amplifier which can provide a small wavelength dependence of gain over a wide wavelength range of 1.545 μm to 1.560 μm and can also provide a large input/output dynamic range. Accordingly, the optical fiber amplifier according to the present invention is suitable for simultaneous amplification of WDM signal light having fluctuated input power.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 3:
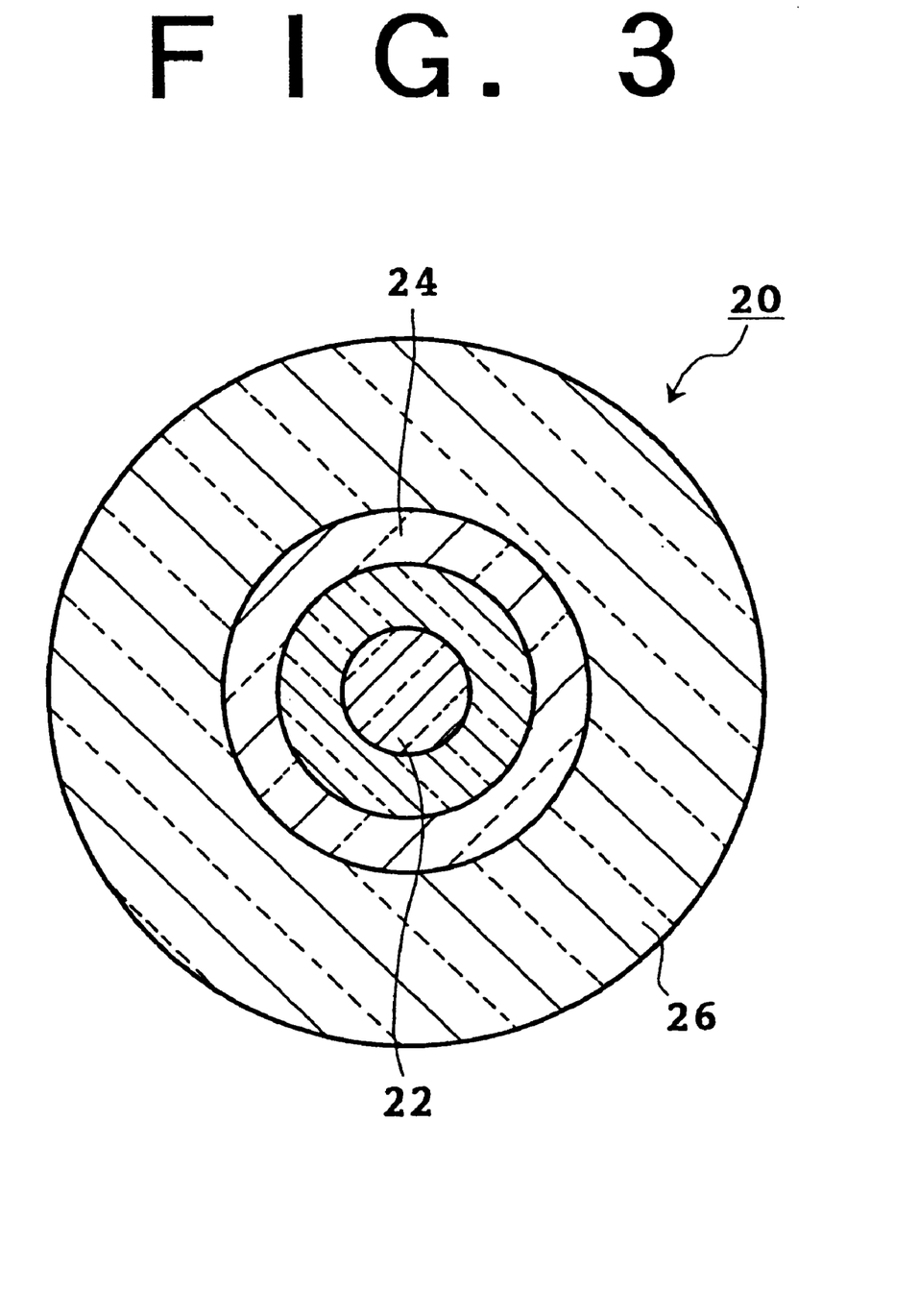
FIG. 3 is a view showing a sectional structure of an optical fiber according to the present invention.

FIG. 3 shows a sectional structure of an optical fiber 20 according to the present invention. The optical fiber 20 is an Er doped fiber (EDF) having a ring doping structure similar to that shown in FIG. 1. That is, the optical fiber 20 includes a center core region 22 and a ring region 24 radially spaced a given distance from the center core region 22. Both the center core region 22 and the ring region 24 are doped with erbium (Er). The center core region 22 is further doped with germanium (Ge) to increase its refractive index. The ring region 24 is included in a cladding 26. Selection of glass materials for the center core region 22 and the ring region 24 and a ratio in Er concentration therebetween were optimized by simulation.

Different glass materials for the regions 22 and 24 were adopted, and which of the following candidates A and B for the glass materials is to be adopted was determined by numerical calculation to be hereinafter described.

Figure 4:
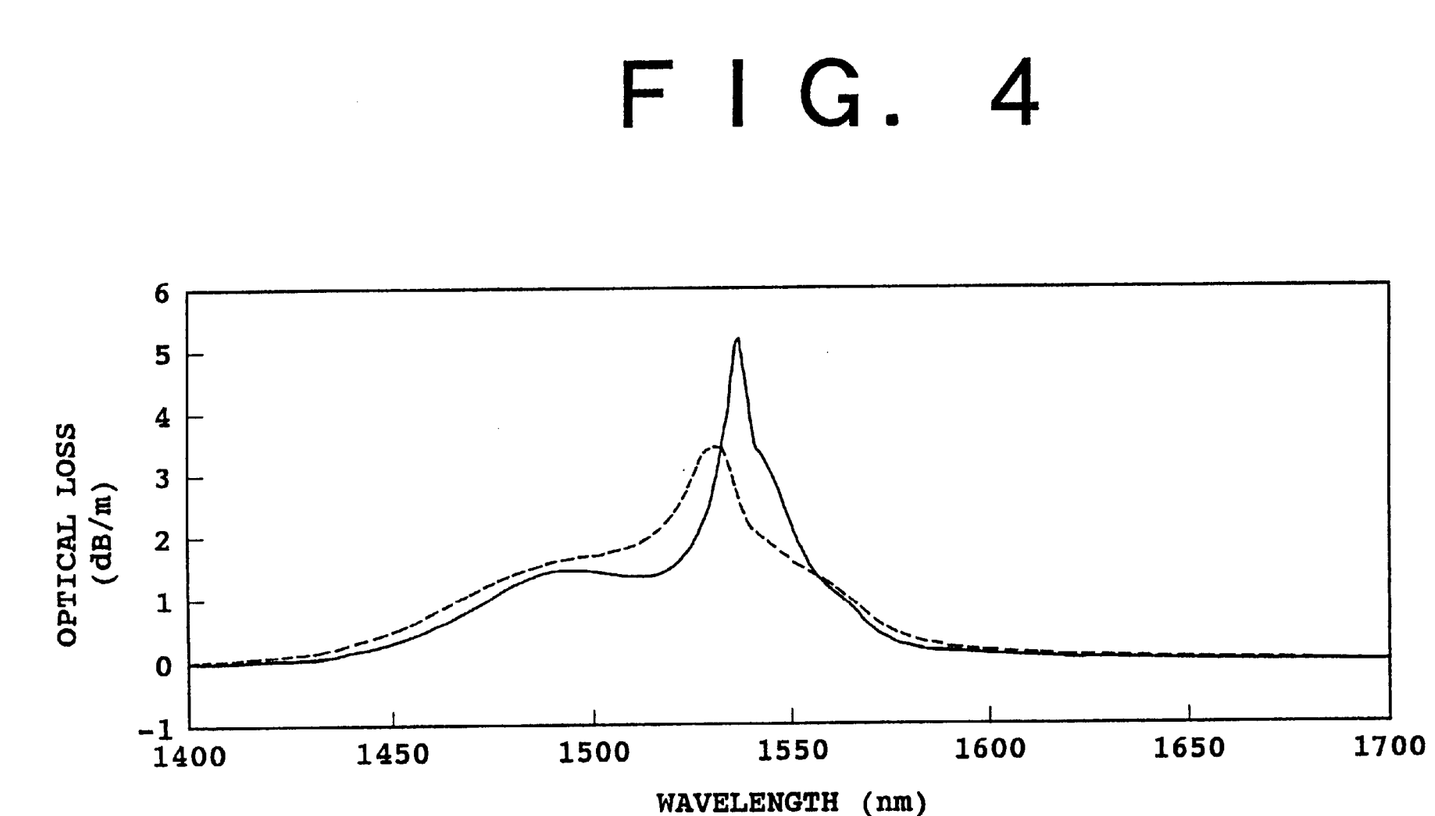
FIG. 4 is a graph showing wavelength dependencies of absorption by Er in Al doped glass and in Al—P codoped glass.

Candidate A Center core region: Al doped glass
    Ring region: Al—P codoped glass
Candidate B Center core region: Al—P codoped glass
    Ring region: Al doped glass The Er concentration is proportional to an Er absorption loss. Therefore, the Er concentrations in the center core region 22 and the ring region 24 were incorporated as optical losses shown in FIG. 4 into the calculation. In FIG. 4, the solid line shows an optical loss in Al—P doped glass, and the broken line shows an optical loss in Al codoped glass. In calculating the gains of the candidates A and B, the Al concentration and the P concentration were fixed to 2 wt. % for each, the fiber length of each candidate was set to 15 m, and the absorption loss ratio in each of the center core region 22 and the ring region 24 was changed in the range of 0.3 to 2.4. The results are shown in FIGS. 5 to 7.

Figure 5:
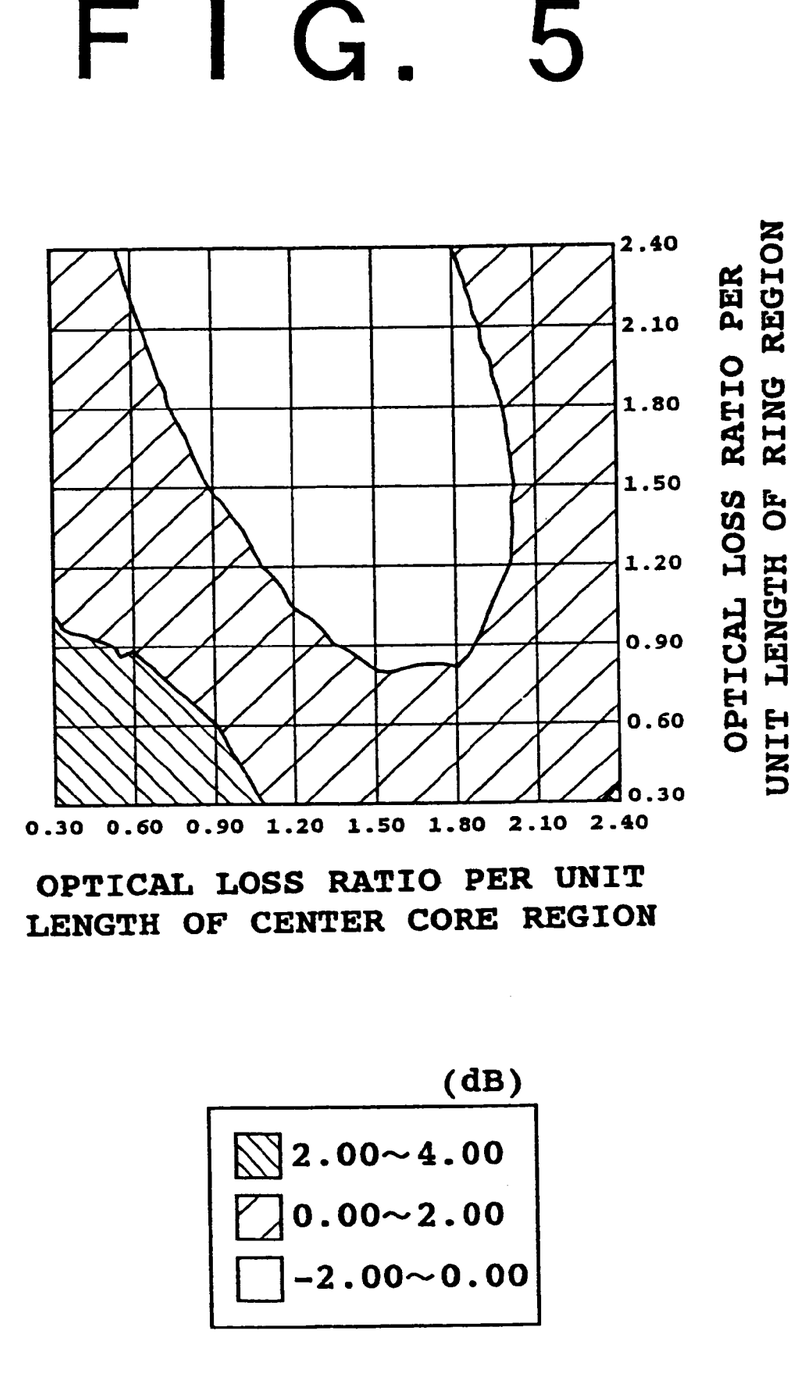
FIG. 5 is a graph showing an input dynamic range of a candidate A.
Figure 6:
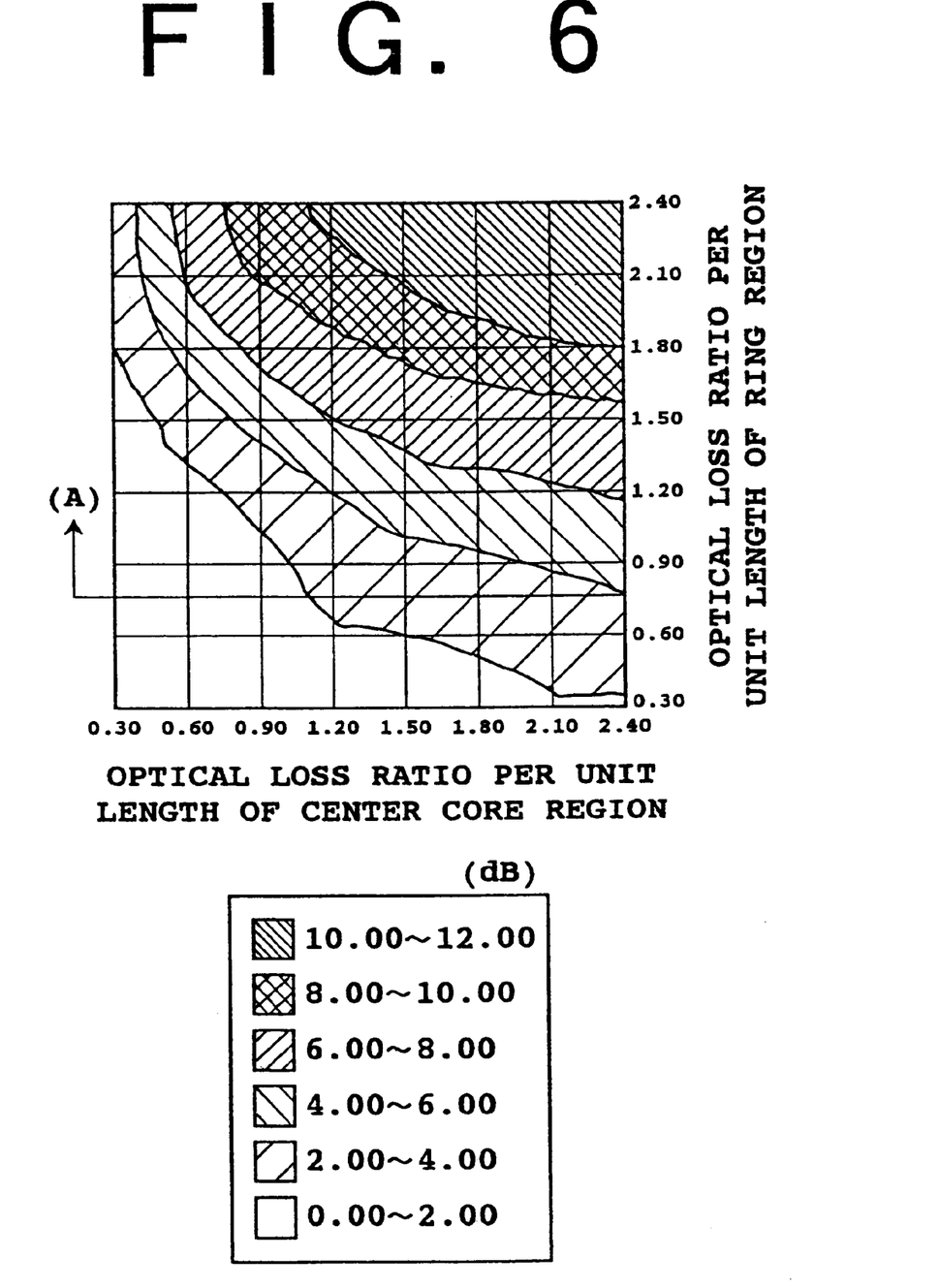
FIG. 6 is a graph showing an input dynamic range of a candidate A.
Figure 7:
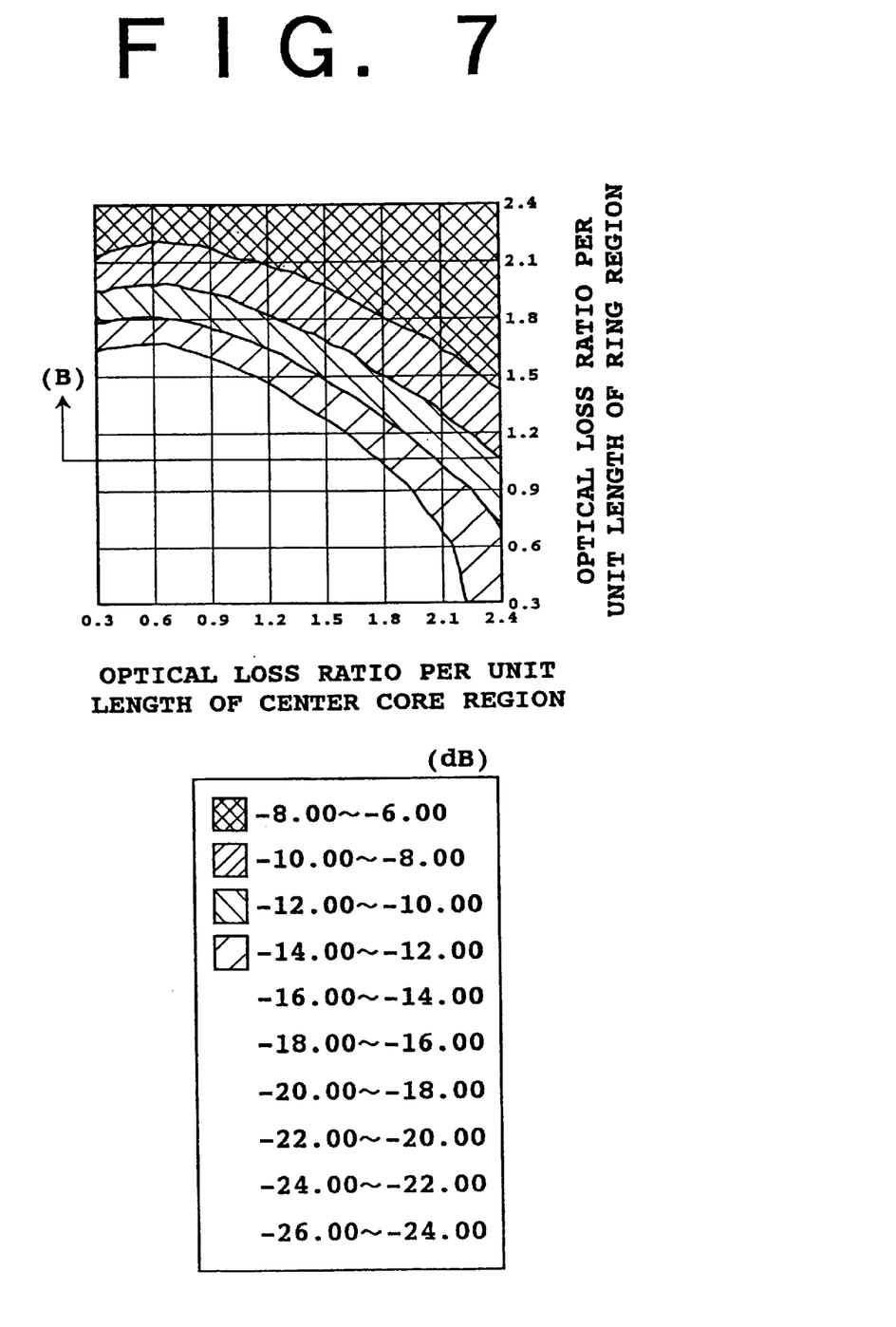
FIG. 7 is a graph showing a conversion efficiency of the candidate B.

FIG. 5 shows an input dynamic range of the candidate A, and FIG. 6 shows an input dynamic range of the candidate B. FIG. 7 shows an efficiency of conversion from pump light to signal light in the candidate B. In each of FIGS. 5 to 7, the horizontal axis represents optical loss ratio per unit length of the center core region 22, and the vertical axis represents optical loss ratio per unit length of the ring region 24. In each region, the Er concentration corresponding to an optical loss ratio of 1.0 is 500 ppm.

The other structural parameters of the optical fiber 20 are as follows:

Mode field diameter (0.98 μm)/(1.48 μm): 3 μm/4.6 μm
Diameter of the center core region 22: 1.2 μm
Inner/outer diameter of the ring region 24: 3 μm/4.2 μm In making the calculation, pump light having wavelengths of 0.98 μm and 1.48 μm was input in a hybrid fashion into each EDF of the candidates A and B, and signal light having wavelengths of 1545 nm, 1549.5 nm, 1554 nm, and 1558 nm was input into each EDF being pumped (reference input power of the signal light: −15 dBm/ch.).

In the case of the present invention, the following two conditions are considered to be criteria for selection of a better EDF.

(1) In the case of changing a ratio in power between the pump light having a wavelength of 0.98 μm and the pump light having a wavelength of 1.48 μm when inputting the pump light into the EDF in a hybrid fashion, the amount of change in output of the signal light in each channel with the flatness of outputs of the signal light in all the channels maintained. That is, maximum input power (dBm)–minimum input power (dBm)=input dynamic range (dB).

(2) A ratio of signal light output power to maximum input pump light power=conversion efficiency (dB) (10×log(total output signal light power)/(maximum input pump light power)).

As apparent from FIG. 5, the candidate A can merely obtain a small input dynamic range of about 4 dB at most. In contrast, as apparent from FIG. 6, the candidate B can obtain a large input dynamic range of 10 dB or more by suitably selecting an optical loss ratio. Thus, the candidate B is suitable for the glass material composition in the present invention from the viewpoint of input dynamic range. That is, the preferable composition is such that the center core region 22 is formed of Al—P codoped glass and the ring region 24 is formed of Al doped glass.

Figure 8:
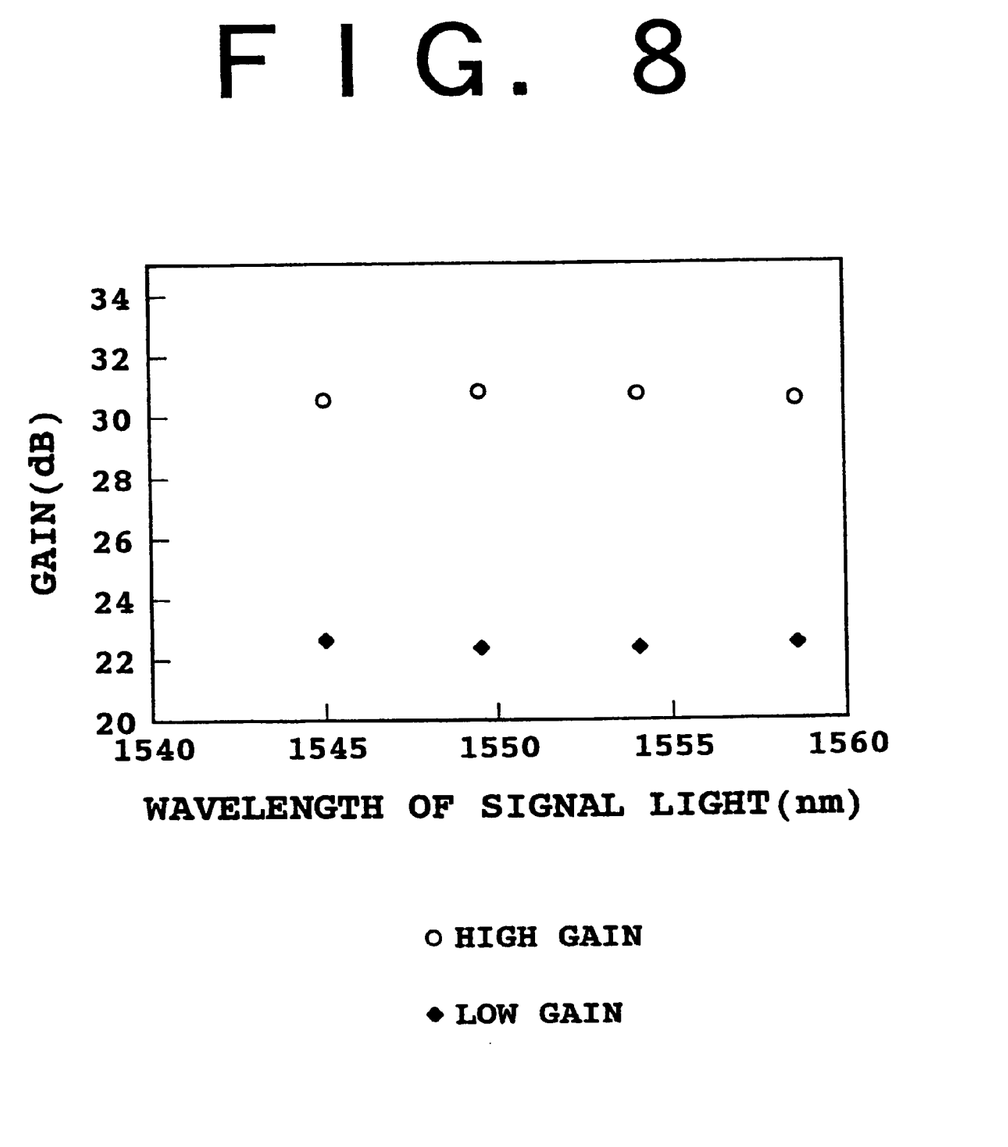
FIG. 8 is a graph showing a wavelength characteristic of gain.

FIG. 8 shows gain-wavelength characteristics in the case that both the optical loss ratio in the center core region 22 and the optical loss ratio in the ring region 24 are set to 0.9 and 2.1. When each optical loss ratio is 0.9, a low gain is obtained in each channel, whereas when each optical loss ratio is 2.1, a high gain is obtained in each channel. As apparent from FIG. 8, an output deviation between channels (wavelengths of signal light) is as very small as about 0.5 dB.

Next, the optical loss over the entire length (15 m) of the EDF of the candidate B will now be described.

(A) The optical loss required to obtain a preferable input dynamic range of 4 dB or more is calculated as follows:

As apparent from FIG. 6, a required optical loss ratio per reference length (15 m) of the ring region 24 to obtain an input dynamic range of 4 dB or more is 0.8 or more. Accordingly, the absorption loss in the ring region 24 over the entire length (15 m) of the EDF becomes (the wavelength characteristic in the graph of FIG. 4)×0.8×15 dB or more. For example, the optical loss in the ring region 24 at a wavelength of 1.55 μm is 1.6 dB×0.8×15 or more.

(B) A preferable conversion efficiency of 10% or more is set.

As apparent from FIG. 7, a required optical loss ratio per reference length (15 m) of the ring region 24 to obtain a conversion efficiency of 10% or more is 1.05 or more. Accordingly, the absorption loss in the ring region 24 over the entire length (15 m) of the EDF becomes (the wavelength characteristic in the graph of FIG. 4)×1.05×15 dB or more. For example, the optical loss in the ring region 24 at a wavelength of 1.55 μm is 1.6 dB×1.05×15 or more.

(C) A maximum required pump light power of 600 mW or less is set.

Figure 9:
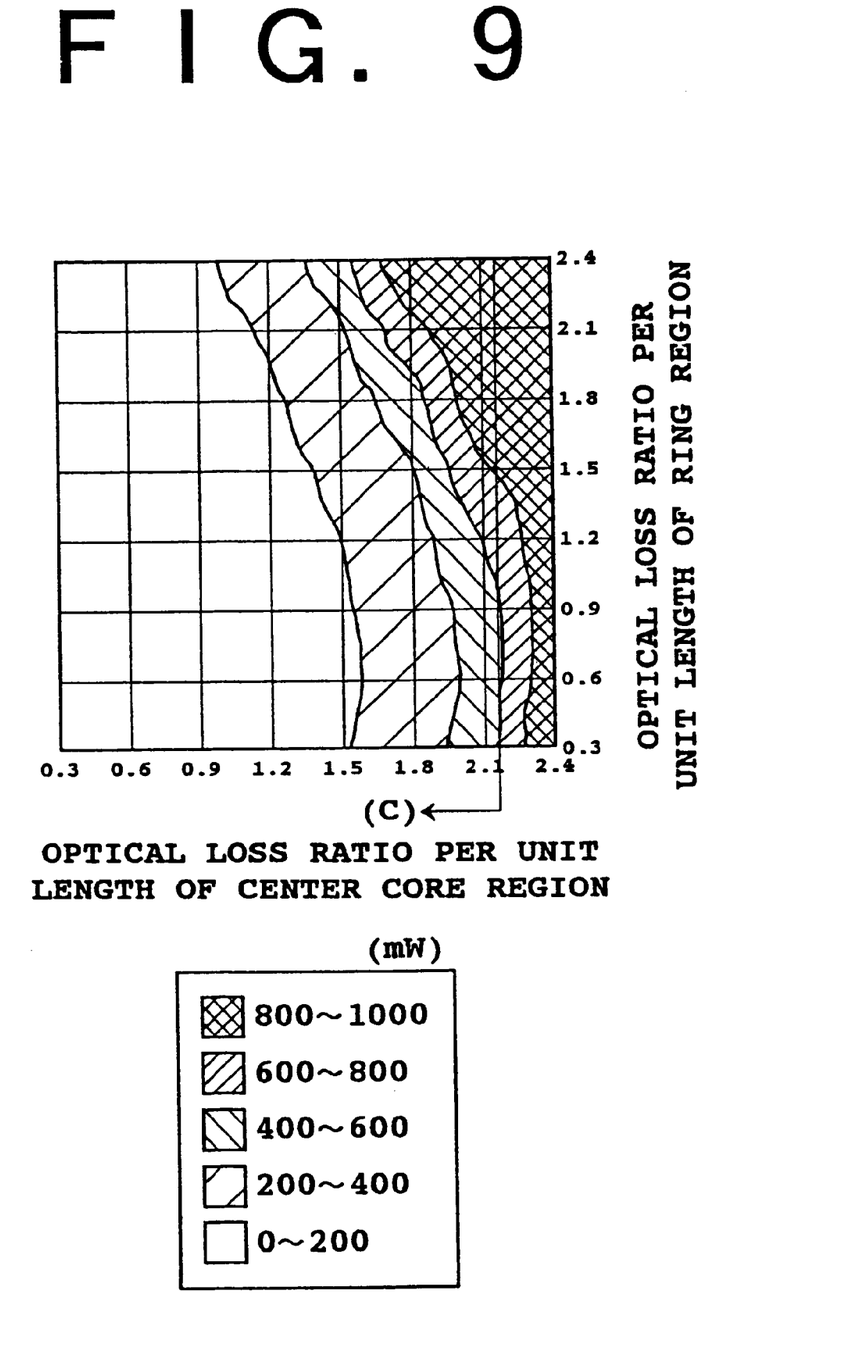
FIG. 9 is a graph showing a maximum pump light power.

As apparent from FIG. 9, a required optical loss ratio per reference length (15 m) of the center core region 22 to obtain a maximum required pump light power of 600 mW or less is 2.2 or less. Accordingly, the absorption loss in the center core region 22 over the entire length (15 m) of the EDF becomes (the wavelength characteristic in the graph of FIG. 4)×2.2×15 dB or less. For example, the optical loss in the center core region 22 at a wavelength of 1.55 μm is 2.0 dB×2.2×15 or less.

Figure 10:
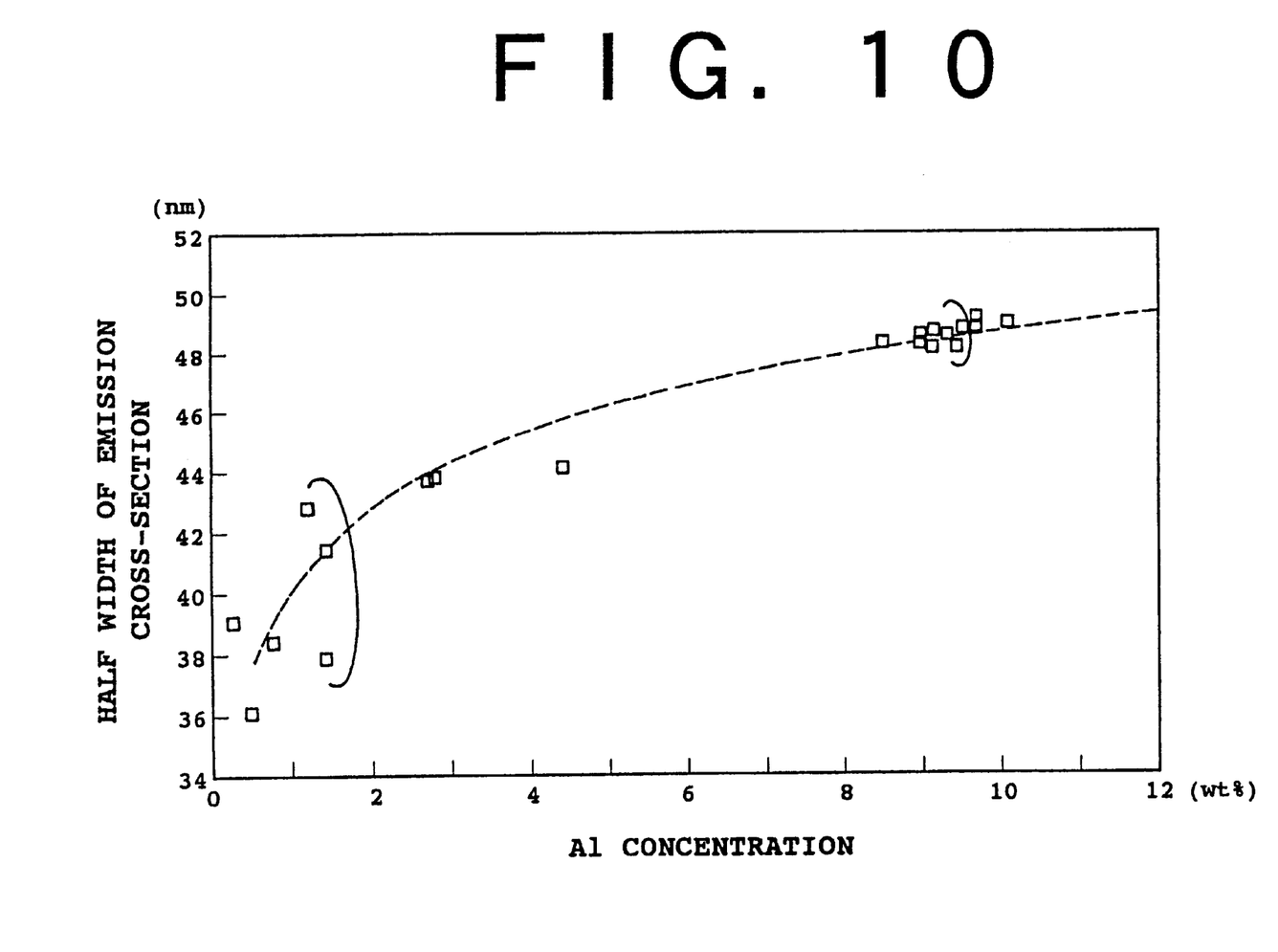
FIG. 10 is a graph showing the relation between Al concentration and half width of emission cross-section.

Referring to FIG. 10, there is shown the relation between concentration of Al contained in the ring region 24 and half width of emission cross-section. As apparent from FIG. 10, the concentration of Al contained in the ring region 24 is preferably set to 3 wt.% or more, because the half width of emission cross-section is preferably 44 nm or more.

Figure 11:
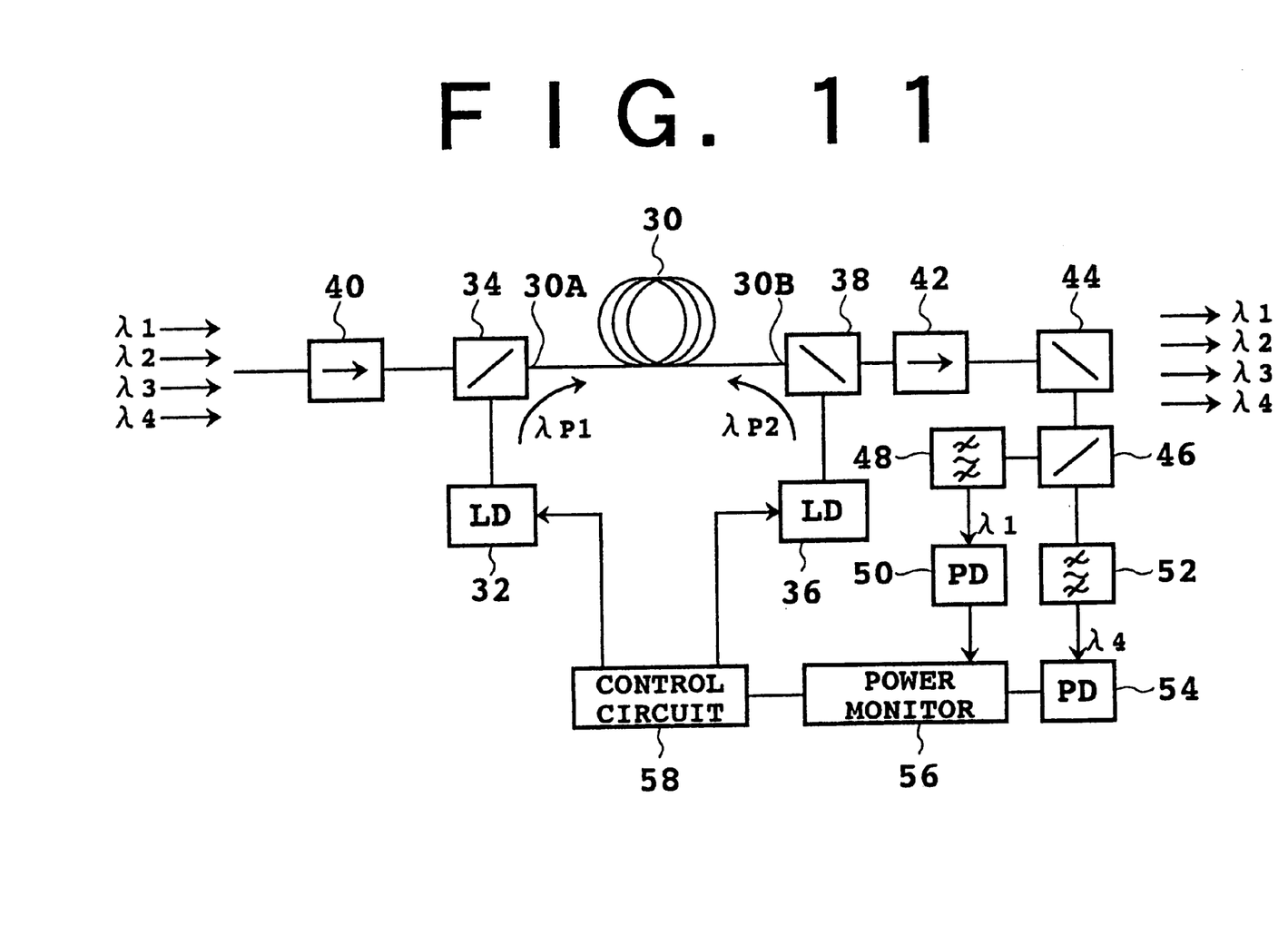
FIG. 11 is a block diagram showing a preferred embodiment of the optical fiber amplifier according to the present invention.

Referring to FIG. 11, there is shown a preferred embodiment of an optical fiber amplifier employing an EDF 30 according to the present invention. The optical fiber amplifier includes a first pumping source 32 and a second pumping source 36. The first pumping source 32 is a laser diode for outputting first pump light having a wavelength band of 0.98 μm. The second pumping source 36 is a laser diode for outputting second pump light having a wavelength band of 1.48 μm. A first end 30A of the EDF 30 and the first pumping source 32 are connected to a WDM coupler 34. Accordingly, the first pump light output from the first pumping source 32 is supplied through the WDM coupler 34 into the EDF 30 from its first end 30A. A second end 30B of the EDF 30 and the second pumping source 36 are connected to a WDM coupler 38. Accordingly, the second pump light output from the second pumping source 36 is supplied through the WDM coupler 38 into the EDF 30 from its second end 30B.

An optical isolator 40 on the input side is also connected to the WDM coupler 34, and an optical isolator 42 on the output side is connected to the WDM coupler 38. WDM signal light obtained by wavelength division multiplexing optical signals having wavelengths $\lambda_1$ to $\lambda_4$ in four channels is supplied through the optical isolator 40 and the WDM coupler 34 in this order to the EDF 30.

When the WDM signal light is supplied to the EDF 30 being pumped by the first and second pump lights, the WDM signal light is amplified in the EDF 30, and the amplified WDM signal light is passed through the WDM coupler 38 and the optical isolator 42 in this order and output from the optical fiber amplifier. A part of the amplified WDM signal light passed through the optical isolator 42 is extracted by an optical coupler 44. The extracted light is branched into first and second monitor lights by another optical coupler 46.

The first monitor light is passed through an optical bandpass filter 48, and next converted into an electrical signal by a photodetector 50. On the other hand, the second monitor light is passed through an optical bandpass filter 52, and next converted into an electrical signal by a photodetector 54. The filter 48 has a passband including the shortest wavelength $\lambda_1$, and the filter 52 has a passband including the longest wavelength $\lambda_4$.

The electrical signals output from the photodetectors 50 and 54 are supplied to a power monitor 56. The levels of the electrical signals output from the photodetectors 50 and 54 respectively correspond to the powers of the optical signals having the wavelengths $\lambda_1$ and $\lambda_4$ amplified in the optical fiber amplifier. A control circuit 58 is provided to control a drive current for the first pumping source 32 and a drive current for the second pumping source 36 according to an output signal from the power monitor 56. More specifically, the control circuit 58 controls the levels of the powers of the first and second pump lights to be respectively output from the first and second pumping sources 32 and 34 and further controls the ratio between the powers of the first and second pump lights, thereby substantially equalizing the powers of the optical signals having the wavelengths $\lambda_1$ and $\lambda_4$ amplified in the optical fiber amplifier. In this preferred embodiment, $\lambda_1$=1545 nm and $\lambda_4$=1558 nm.

In the case of WDM transmission of optical signals in four channels as described above, the output levels of the optical signals having the shortest wavelength and the longest wavelength are controlled to become substantially equal to each other, thereby substantially equalizing the output levels of all the optical signals in the four channels. While the ring region 24 of the Er doped fiber 20 is present in the cladding 26 in the above description, the ring region 24 may be doped with Ge and provided in the core.

According to the present invention, it is possible to realize an Er doped fiber which can provide a small wavelength dependence of gain and a large input/output dynamic range. Accordingly, the Er doped fiber according to the present invention is suitable for simultaneous amplification of WDM signal light. Further, even when the power of WDM signal light to be input into the Er doped fiber is changed, flat gains on all the optical signals can be obtained.

What is claimed is:

1. An optical amplifying fiber comprising:
    a center core region doped with erbium, aluminum, and phosphor; and
    a ring region doped with erbium and aluminum, said ring region being radially spaced a given distance from said center core region.

2. An optical amplifying fiber according to claim 1, wherein the concentration of said aluminum contained in said ring region is 3 wt. % or more.

3. An optical amplifying fiber according to claim 1, wherein when said optical amplifying fiber is pumped by two pump lights having wavelength bands of 0.98 μm and 1.48 μm, an optical loss in said ring region at a wavelength of 1.55 μm is 1.6 dB×0.8×15 or more.

4. An optical amplifying fiber according to claim 3, wherein said optical loss in said ring region at the wavelength of 1.55 μm is 1.6 dB×1.05×15 or more.

5. An optical amplifying fiber according to claim 1, wherein when said optical amplifying fiber is pumped by two pump lights having wavelength bands of 0.98 μm and 1.48 μm, an optical loss in said center core region at a wavelength of 1.55 μm is 2.0 dB×2.2×15 or less.

6. An optical fiber amplifier suitable for amplification of wavelength division multiplexed signal light, comprising:
    an optical fiber having a center core region doped with Er, Al, P, and a ring region doped with Er and Al, said ring region being radially spaced a given distance from said center core region;
    a first pumping source for outputting first pump light having a first wavelength band;
    a second pumping source for outputting second pump light having a second wavelength band;
    a first multiplexer for coupling said first pump light to said optical fiber;
    a second multiplexer for coupling said second pump light to said optical fiber;
    a first coupler for branching amplified signal light output from said optical fiber to obtain monitor light;
    a second coupler for branching said monitor light into first and second monitor lights;
    a first filter for filtering said first monitor light to obtain first signal light having a wavelength $\lambda_1$;
    a second filter for filtering said second monitor light to obtain second signal light having a wavelength $\lambda_2$;
    a first photodetector for detecting said first signal light;
    a second photodetector for detecting said second signal light; and
    control means for controlling power levels and a power ratio of said first and second pump lights to be output from said first and second pumping sources so that outputs from said first and second photodetectors become equal to each other to reach a given level.

7. An optical fiber amplifier according to claim 6, wherein:
    said first pumping source is a laser diode for outputting said first pump light, and said first wavelength band is a 0.98 μm band; and
    said second pumping source is a laser diode for outputting said second pump light, and said second wavelength band is a 1.48 μm band.

8. An optical fiber amplifier according to claim 7, wherein said wavelength division multiplexed signal light includes light having wavelengths of 1.545 μm to 1.56 μm.

9. An optical fiber amplifier according to claim 6, wherein said wavelength $\mu_1$ of said first signal light is a shortest one of the wavelengths of said wavelength division multiplexed signal light, and said wavelength $\lambda_2$ of said second signal light is a largest one of the wavelengths of said wavelength division multiplexed signal light.

* * * * *